United States Patent
Hill

(10) Patent No.: US 9,055,124 B1
(45) Date of Patent: Jun. 9, 2015

(54) ENHANCED CACHING OF NETWORK CONTENT

(75) Inventor: Peter F. Hill, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 240 days.

(21) Appl. No.: 13/527,450

(22) Filed: Jun. 19, 2012

(51) Int. Cl.
*G06F 15/16* (2006.01)
*H04L 29/06* (2006.01)
*H04L 12/28* (2006.01)

(52) U.S. Cl.
CPC ............ *H04L 65/403* (2013.01); *H04L 12/283* (2013.01)

(58) Field of Classification Search
USPC .................... 709/213, 203; 711/146; 702/179
See application file for complete search history.

(56) References Cited

U.S. PATENT DOCUMENTS

| | | | |
|---|---|---|---|
| 6,708,137 B2 * | 3/2004 | Carley | 702/179 |
| 6,763,435 B2 * | 7/2004 | Arimilli et al. | 711/146 |
| 6,976,131 B2 * | 12/2005 | Pentkovski et al. | 711/146 |
| 2004/0039880 A1 * | 2/2004 | Pentkovski et al. | 711/146 |
| 2004/0128346 A1 * | 7/2004 | Melamed et al. | 709/203 |

* cited by examiner

*Primary Examiner* — Tammy Nguyen
(74) *Attorney, Agent, or Firm* — Knobbe Martens Olson & Bear LLP

(57) ABSTRACT

Features are disclosed for caching network resources. A system determines whether a resource which does not contain an indication in its associated header that it is cacheable may nevertheless be cached. The determination may be based on observations of a number of requests for the resource over time and from a number of different requesting clients. In response to determining that the resource is cacheable, the system may cache the resource, and in some cases modify the cache control header of resource to facilitate caching. The system may insert fields into the header or otherwise modify the header so that the resource may be cached at a network computing provider, at a requesting client device, or at some other shared or private cache.

20 Claims, 6 Drawing Sheets

ENHANCED CACHING OF NETWORK CONTENT

BACKGROUND

A computing device, such as a personal computer or other device, can be used to request content over a communication network from another computing device, such as a server. For example, a web page can be requested by a mobile phone and delivered to the phone by a web server via the Internet. In some instances, portions of the requested content may be requested multiple times by the same computing device, such as images, etc. Content providers can designate which objects responsive to a request may be cached in local memory for faster retrieval and processing in response to future requests, often avoiding subsequent requests for the content to the content provider.

When the Hypertext Transfer Protocol (HTTP) is used for communication between a client and server, headers are communicated with each object. The headers contain information about the source of the object, the type of the object, the time the object was transmitted, and the like. A content provider may also include cache control information in the headers. For example, the cache control information can include an indicator that the object may be cached, an expiration date or lifetime for the object, or an indicator that the object may not be cached. In many cases, there is no cache control information in the header, and the corresponding objects are typically treated as if they are not cacheable.

In addition to maintaining requested objects locally at a requesting computing device, at least some of the requested objects may be cached in shared caches at various computing devices utilized in facilitating data transfer between the requesting client computing device and the responding server. Common caching components include content delivery network (CDN) service providers and proxy servers that implement computing devices in a communication network that are configured to facilitate and improve the delivery of content on behalf of content providers. In addition, content may be cached at both the content provider and requesting client.

When a resource is cached at a shared cache, subsequent requests for the resource can be responded to with the cached resource, thereby avoiding a potentially inefficient request to the content provider for the resource. If a client has cached the resource locally, subsequent requests from the client may be fulfilled from the local cache. Prior to retrieving content from a cache, whether shared or local, a request for information regarding whether the resource has changed in the time since it was cached may be made to the content provider. Such a request may be known as an "if-modified-since" request. If the object has been modified, the "if-modified-since" request can be responded to with the modified object; otherwise, the request can be responded to with data indicating that the object has not been modified since it was cached.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
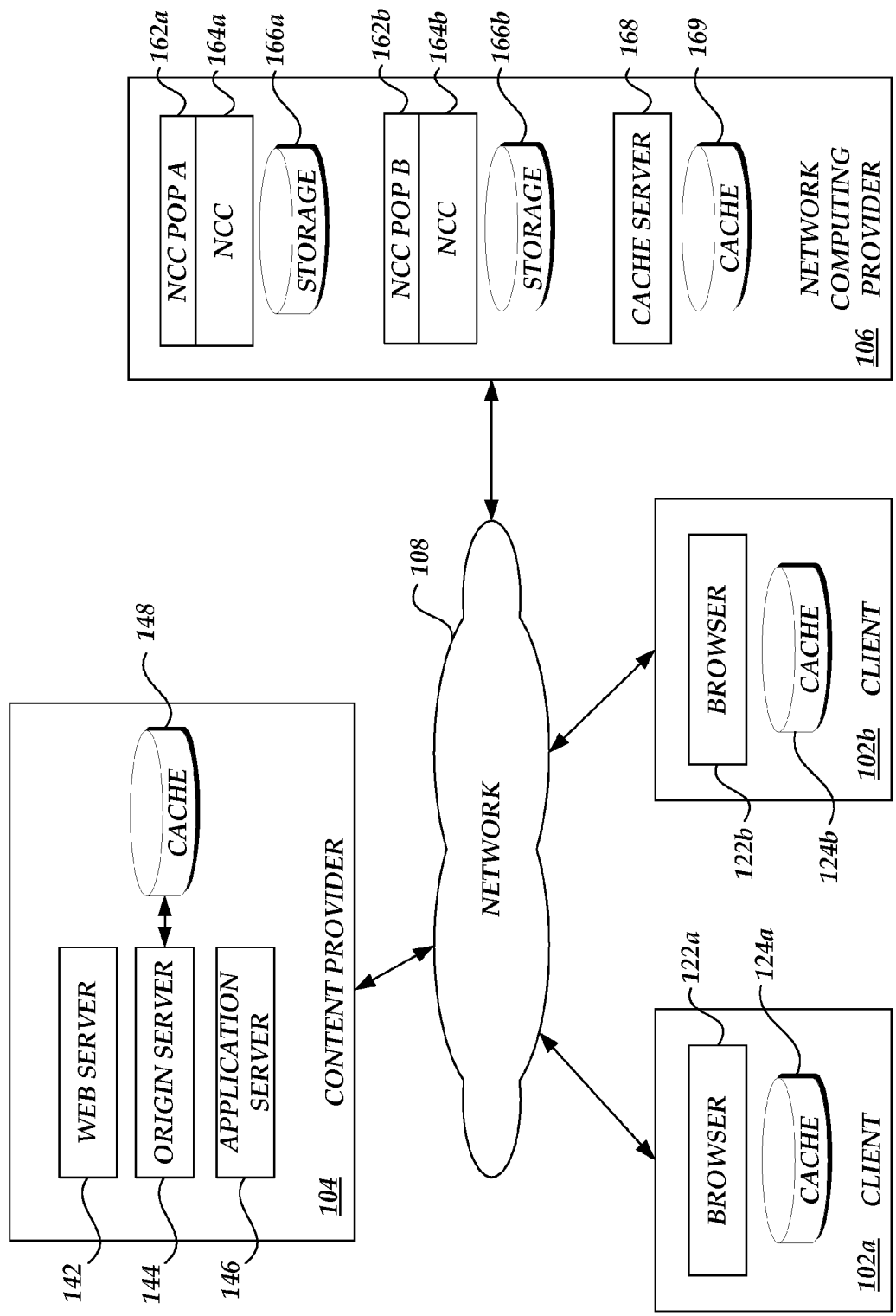
FIG. 1 is a block diagram of an illustrative network computing environment including a content provider, a network computing provider, and multiple clients.

Generally described, the present disclosure relates to caching network resources. Specifically, aspects of the present disclosure relate to associating caching properties to a resource independent of a caching property presently associated with the resource. A network computing provider that provides computing services to any number of different client devices can monitor requests for a specific resource over time and from different client devices. The network computing provider can determine whether the resource retrieved in response to each request is sufficiently similar and therefore can be associated with caching properties to improve the management and delivery of requests for the resource. Responsive to the determined caching properties, the network computing provider may cache the resource according to the determined caching properties even though the resource does not indicate in its associated header that the resource is cacheable, or it has been previously associated with different caching properties.

Further aspects of the present disclosure relate to modifying headers that are associated with resources to be cached. For example, a resource may be determined to be cacheable even though the header associated with the resource does not contain an indication that the resource is cacheable. In another example, a resource may be associated with header that indicates the resource is cacheable for a very short time (e.g., the resource is assigned a brief time to live (TTL)), while the network computing provider determines that the resource changes infrequently. The network computing provider may insert fields into the header or otherwise modify the header.

Additional aspects of the present disclosure relate to responding to requests for information about modifications to cached resources. For example, a client device or some other device that has previously cached a resource can request information about whether the resource has changed in the time since it was cached. Rather than sending or forwarding such requests to an original content provider, an intermediary system can instead respond to the requests, thereby implementing a change in the amount of time that a resource is cached. The response can indicate that the resource has not changed and therefore may be retrieved from a cache. If the resource has changed, or if the intermediary system determines that the cached resource should be updated, the response may include an updated version of the resource or instructions to retrieve an updated version. Moreover, if only a portion of the resource has changed in the time since it was cached, a response can be transmitted that includes the changed portion in the response header itself, thereby obviating the need to request and/or transmit a new copy of a resource that has only partially changed.

Although aspects of the embodiments described in the disclosure will focus, for the purpose of illustration, on a network computing provider that receives content requests from client devices, and that retrieves and caches the requested content for the client devices, one skilled in the art will appreciate that the techniques disclosed herein may be applied to any number of software processes or applications. Further, although various aspects of the disclosure will be described with regard to illustrative examples and embodiments, one skilled in the art will appreciate that the disclosed embodiments and examples should not be construed as limiting.

With reference to an illustrative example, several clients may be associated with a network computing provider, such as a proxy service which act as an intermediary between clients and content providers, and which caches content from content providers and provides it to the clients in response to subsequent client requests for the content. In another example, several clients may be associated with an accelerated browsing service which requests content from content providers on the clients' behalf and which optimizes or otherwise processes the content prior to transmitting it to the requesting client. Over a period of time, the clients may each request a network resource, such as a web site, which includes embedded resources, such as images, information, videos, and the like. Certain embedded resources may have a common name, source, and other identifying attributes across each request. The resource may or may not be similar, however, even though they share a number of identifying attributes. In order to determine whether such resources are sufficiently similar and are therefore candidates for caching, the resources themselves can be compared. The network computing provider may apply a checksum or digest function, such as a hashing algorithm, to each resource. A checksum is a fixed-size data value that may be computed from input data of an arbitrary length. There is an extremely high probability that checksums computed from two different inputs will be different. The checksums for the embedded resources can be compared. The result may indicate that the resource is sufficiently similar regardless of which client requested the resource, thereby making the resource a candidate for caching. The header associated with the resource, however, may not indicate that the resource is cacheable. Typically, a network computing provider would not cache any object that has been associated with a caching attribute that indicated that the resource should not be cached or in which no caching attribute has been set.

Illustratively, the network computing provider can modify the header, adding cache control information to facilitate caching of the resource even though it would typically be considered uncacheable due to the lack of information in the header indicating that the resource is cacheable. Subsequent requests for the resource can be responded to with the cached resource, thereby avoiding a potentially inefficient request to the content provider for the resource. If a client has cached the resource locally, subsequent requests from the client for the resource may be preceded by a request for information regarding whether the resource has changed in the time since it was cached. Such a request may be known as an "if-modified-since" request. Normally such requests are forwarded to the content provider. Due to the modification applied to the header by the network computing provider, a content provider may respond to the "if-modified-since" request with another copy of the resource regardless of whether the resource has actually been modified or not, defeating any performance gain that may be provided by caching. To avoid this result, the network computing provider can intercept such "if-modified-since" requests and authoritatively answer them.

Various aspects of the disclosure will now be described with regard to certain examples and embodiments, which are intended to illustrate but not limit the disclosure.

Prior to describing embodiments of the cache control header management process in detail, an example network computing environment in which caching may be implemented will be described. FIG. 1 illustrates a network computing environment including multiple clients 102a, 102b, a content provider 104, and a network computing provider 106 in communication over a network 108. In some embodiments, the network computing environment may include additional or fewer components that those illustrated in FIG. 1. For example, the network computing environment may include multiple network computing providers 106 and thousands or millions of content providers 104 and clients 102. The network computing environment may also include other types of entities, such as content delivery network (CDN) service providers, domain name system (DNS) servers, and the like.

The clients 102a, 102b can correspond to a wide variety of computing devices including personal computing devices, laptop computing devices, hand held computing devices, terminal computing devices, mobile devices, wireless devices, various electronic devices and appliances and the like. In an illustrative embodiment, the clients 102a, 102b include one or more processors, a memory, and a computer-readable medium drive from which software applications may be loaded into the memory, where they are executed by the processors. The software may include components for establishing communications over a communication network 108, such as a wide area network or local area network. In addition, the software applications may include browsers 122a, 122b that facilitate communications via the Internet or an intranet. The clients 102a, 102b may also include caches 124a, 124b for temporarily storing network resources obtained from a network computing provider 106 or a content provider 104. The caches 124a, 124b can be located in volatile memory such as RAM, in nonvolatile storage such as a hard disk, some combination thereof, or any other electronic data storage. Although not illustrated in FIG. 1, each client 102a, 102b utilizes some type of local DNS resolver component, such as a DNS Name server, that generates the DNS queries attributed to the client 102a, 102b.

The network computing environment can also include a content provider 104 in communication with the network computing provider 106 or the one or more clients 102a, 102b via the communication network 108. The content provider 104 illustrated in FIG. 1 corresponds to a logical association of one or more computing devices associated with the content provider 104. Specifically, the content provider 104 can include a web server component 142 corresponding to one or more server computing devices for obtaining and processing requests for content (such as web pages) from the clients 102a, 102b. The content provider 104 can further include an origin server component 144 and associated cache component 148 corresponding to one or more computing devices for obtaining and processing requests for network resources from a client 102a, 102b, the network computing provider 106, a CDN service provider (not shown), or some other entity. The content provider 104 can still further include an application server computing device 146, such as a data streaming server, for processing streaming content requests. One skilled in the relevant art will appreciate that the content provider 104 can be associated with various additional computing resources, such additional computing devices for administration of content and resources, DNS name servers, and the like. For example, although not illustrated in FIG. 1, the content provider 104 can be associated with one or more DNS name server components that would be authoritative to resolve client computing device DNS queries corresponding to a domain of the content provider.

With continued reference to FIG. 1, the network computing environment can also include a network computing provider 106 in communication with the one or more client computing devices 102a, 102b, the content provider 104, and other network entities via the communication network 108. The network computing provider 106 also corresponds to a logical association of one or more computing devices associated with a network computing services. Specifically, the network computing provider 106 can include a cache server 168 and a number of Point of Presence ("POP") locations 162a, 162b that correspond to nodes on the communication network 108. The cache server 168 can include physical computing device resources and software to provide caching services to the various NCC POPs 162a, 162b. The caching sever 168 can store network resources in a cache 169 and later service requests for the network resource from the cache 169, thereby avoiding a retrieval of the network resource from the content provider 104, which can be substantially more time consuming. The cache 169 can include any electronic data store, and may be physically located on a computing device of the cache server or on one or more separate devices.

Each POP 162a, 162b includes a network computing component (NCC) 164a, 164b for hosting applications, such as data streaming applications, via a number of instances of a virtual machine, generally referred to as an instance of an NCC. Such NCCs 164a, 164b can include physical computing device resources and software to provide the multiple instances of a virtual machine or to dynamically cause the creation of instances of a virtual machine. Such creation can be based on a specific request, such as from a client, or the NCC can initiate dynamic creation of an instance of a virtual machine on its own. Each NCC POP 162a, 162b also includes a storage component 166a, 166b made up of a number of storage devices for storing resources from content providers 104 which will be processed by an instance of an NCC 164a, 164b and transmitted to various client computers, such as clients 102a, 102b. The NCCs 164a, 164b and the storage components 166a, 166b may further include additional software and/or hardware components that facilitate communications including, but not limited to, load balancing or load sharing software/hardware components for selecting instances of a virtual machine supporting a requested application and/or providing information to a DNS nameserver to facilitate request routing.

In an illustrative embodiment, NCCs 164a, 164b and the storage components 166a, 166b are considered to be logically grouped, regardless of whether the components, or portions of the components, are physically separate. Additionally, although the NCC POPs 162a, 162b are illustrated in FIG. 1 as logically associated with the network computing provider 106, the NCC POPs 162a, 162b may be geographically distributed throughout the communication network 108 in a manner to best serve various demographics of clients 102a, 102b. Additionally, the network computing provider 106 can be associated with various additional computing resources, such additional computing devices for administration of content and resources, and the like. Further, the components of the network computing provider 106 and components of the content provider 104 can be managed by the same or different entities.

In operation, a network computing provider 106 may act as an intermediary between clients, including the clients 102, 102b, and content sources, including the content provider 104, a CDN service provider, and the like. For example, the network computing provider 106 may provide proxy services to client 102a. Accordingly, the client 102a can transmit requests for content to the network computing provider 106 via the communication network 108, even though the content originates from the content provider 104. The network computing provider 106 then requests content from the content provider 104 on behalf of the client computing device 102a. The content may or may not be cacheable, as indicated in the Hypertext Transfer Protocol (HTTP) headers associated with the various network resources, embedded resources, and other objects that make up the requested content. The resources can include Hypertext Markup Language (HTML) files, HTML applications, JavaScript files, Cascading Style Sheet (CSS) files, images, videos, animations, applets, audio files, documents, or any network accessible file.

Each resource is typically associated with an HTTP header that is transmitted with the resource. The HTTP header may specify that the resource is permitted to be cached, how long the resource may be cached, or that the resource is not to be cached at all. For example, the resource may be a private object, such as an icon customized for each user to be displayed on a requested web page. The HTTP header associated with such a customized icon may specify that it is not to be cached. In another example, a resource may be an HTML file that defines a public page of a web site. The HTTP header associated with this type of public object may specify that the object may be cached for several hours or longer.

Often, however, the HTTP header does not indicate whether a resource may or may not be cached. In some embodiments, the network computing provider 106, or some component thereof, such as the cache server 168, can monitor requests for the resource from multiple clients over time. The cache server 168 can determine that the retrieved object has been identical in response to requests from multiple clients over the course of many hours or longer and therefore is likely to be a public resource such that caching will not put private data at risk. In response to making such a determination, the cache server 168 can modify the HTTP header associated with the resource, adding cache-control information so that the resource can be cached. Subsequent requests for the resource can then be responded to with a cached copy of the resource from the shared cache 169 of the network computing provider 106, rather than by retrieving the resource from the content source 104.

In some embodiments, the HTTP header may indicate that the resource is associated with a brief time to live (TTL). However, the network computing provider 106, or some component thereof such as the cache server 168, may determine that the resource does not typically change for a period of time that exceeds the TTL specified in the HTTP header, or that the resource changes on a predictable schedule that exceeds the TTL. For example, the cache server 168 can determine that a web site updates its home page on a predictable schedule, such as every eight (8) minutes, while the TTL specified in the HTTP header is only one (1) minute. In such cases, the cache server 168 can modify the TTL specified in the HTTP header to extend the TTL of the resource, thereby extending the period of time in which the benefits of caching may be realized for the resource. In the present example, the caching server 168 may increase the TTL to some value less than or equal to the predicted update schedule. In some cases, the cache server 168 may extend the TTL to a period of time that is greater than the predicted update schedule.

Figure 2A:
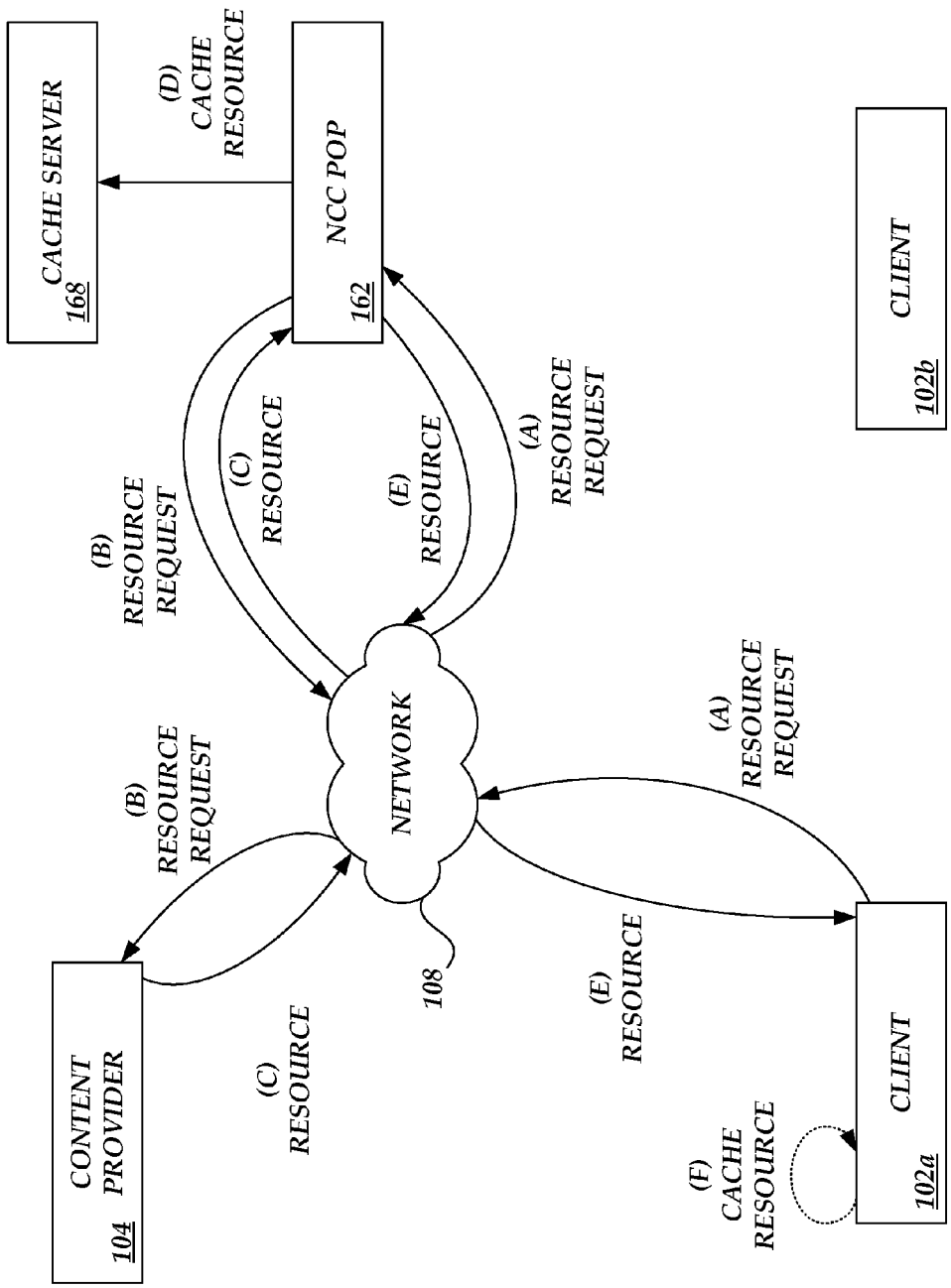
FIG. 2A is a network diagram of an illustrative request from a client for a resource, displaying an intermediary network computing component processing the request and retrieving the requested resource from the content provider on behalf of the client.
Figure 2B:
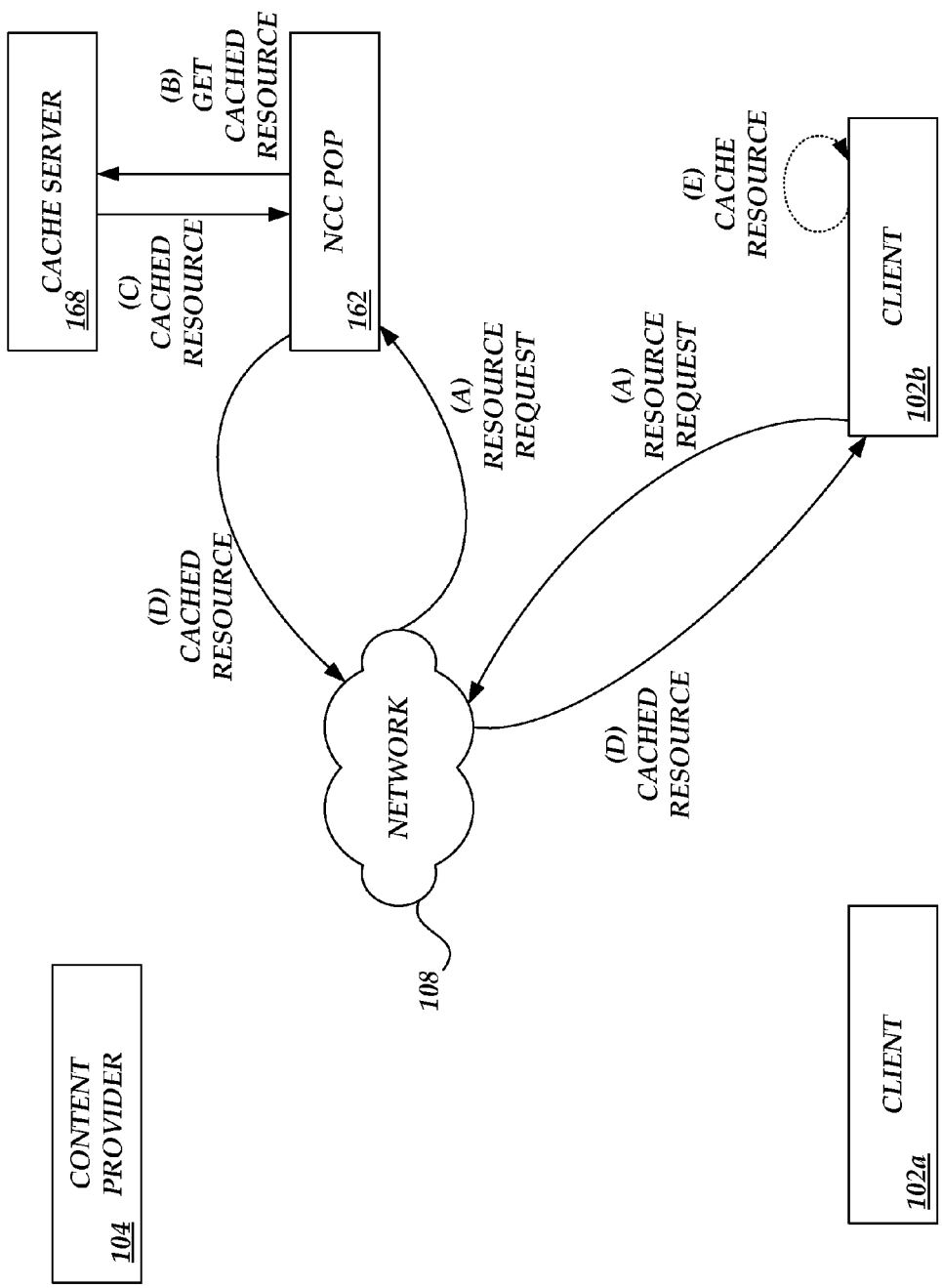
FIG. 2B is a network diagram of an illustrative request from a client for a resource, displaying an intermediary network computing component processing the request and serving the requested resource from a shared cache.
Figure 2C:
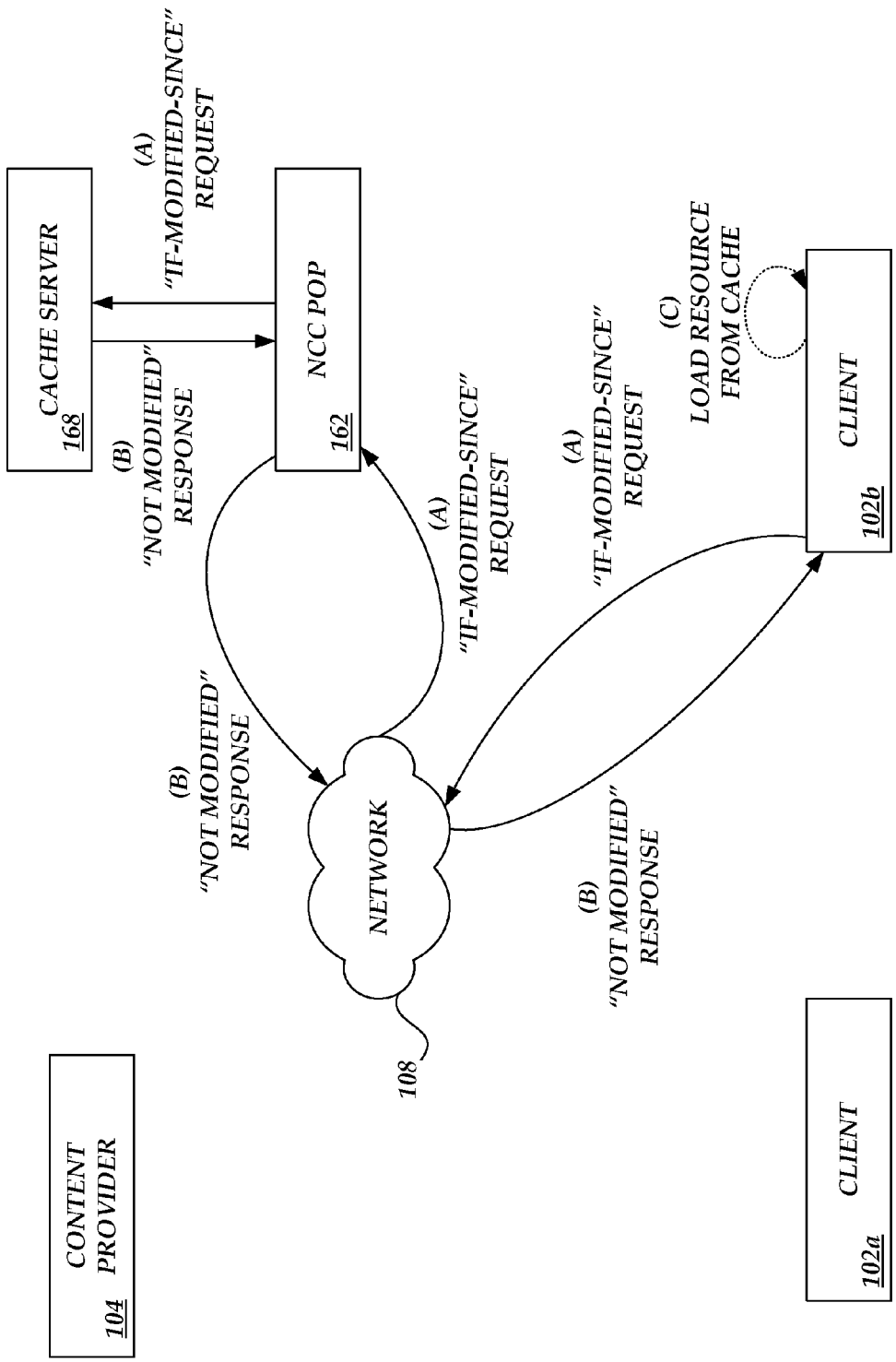
FIG. 2C is a network diagram of an illustrative request from a client for a resource, displaying the client retrieving the resource from a local cache in response to receiving information indicating the resource has not been modified since it was cached.

Turning now to FIGS. 2A, 2B, and 2C, an example of caching management in a network computing environment will be described. The interactions illustrated in FIGS. 2A, 2B, and 2C are described with reference to the network computing environment of FIG. 1. It will be appreciated, however, that any number of differently configured computing environments may be used. A network computing provider 106 can provide computing services, such a proxy services, to a number of clients 102a, 102b. In the example illustrated in FIG. 2A, a client 102a is in communication with an NCC POP 162 of the network computing provider 106. In practice, the client 102a could be in communication with any NCC POP of the network computing provider 106, such as the NCC POPs 162a or 162b of FIG. 1.

A user may cause the client 102a to load a browser 122a for accessing content provided by one or more content providers 104 at (A). The content to be accessed may include a collection of one or more network resources (e.g., a web page) and embedded resources such as images, video, audio, text, executable code, and other resources. Subsequent to the browser 122a being loaded, a user or automated browser process may cause the client 102a to transmit a request to access content from a content provider 104 by establishing a browsing session with an NCC POP 162 across a private or public communication network 108. For example, the user may select or enter a URL (e.g., http://www.xyzwebsite.com) into a browser window, causing the client 102a to transmit a request for the content to the NCC POP 162.

Responsive to the request received from the client 102a, the NCC POP 162 may instantiate or cause to have instantiated one or more computing components associated with the NCC. For example, the NCC POP 162 can instantiate, or cause to have instantiated, an instance of a virtual machine that includes a software browser application capable of requesting resources from a content source, such as a content provider 104, via a communication network 108. Embodiments of such a system are described in detail in U.S. patent application Ser. No. 13/174,589, filed Jun. 30, 2010, and entitled "Remote Browsing Session Management," the contents of which are hereby incorporated by reference in its entirety. In another example, the NCC POP 162 may host a proxy server that requests resources from a content source on behalf of the requesting client 102a. Illustratively, in some situations, one or more devices associated with the NCC POP 162 may be located in a data center or other robustly networked computing environment, and, as compared to the client computing device, may experience relatively little latency or delay when obtaining network resources.

As illustrated in FIG. 2A, the NCC POP 162 may request the identified network resource(s) from one or more content providers 104, a CDN, or a local or associated cache component at (B). In some embodiments, the NCC POP 162 can query the cache server 168 for the requested network resource prior to requesting it from a content source. As described above, the network resource can be a web page and any number of embedded resources or objects associated with the web page. In one example, a client 102a requests an HTML file (e.g.: index.html) associated with a web site (e.g.: http://www.xyzwebsite.com). The NCC POP 162 can query the cache server 168 for the HTML file, and the cache server 168 will respond with the file if it is present in the cache 169 and not expired, or with an indication that the file is either not present in the cache 169 or is expired. If the cache server 168 does not provide the file to the NCC POP 162, the NCC POP 162 can request the file from the content provider 104. In some cases, the file may be hosted by another content source such as a CDN service provider, and the NCC POP 162 will request the file from the CDN instead of the content provider 104.

In some embodiments, the cache server 168 is physically or logically associated with the NCC POP 162 rather than a shared cache server 168 associated with a number of NCC POPs of a network computing provider 106. In some embodiments, the cache server 168 requests network resources from the content provider 104 or other content sources if the requested network resources are not present in the cache 169 or are expired, and responds to NCC POP 162 cache queries with the network resource even if it was not initially in the cache 169.

Having obtained the requested resource at (C), the NCC POP 162 can cache the resource at the cache server 168 at (D) so that it may be available in the future to the NCC POP 162 or other NCC POPs associated with the cache server 168. Typically, the caching of a resource is based on information in the HTTP header associated with the resource. In many cases, the HTTP header associated with a resource does not include cache control information, effectively rendering the resource uncacheable. In some embodiments, the cache server 168, NCC POP 162, or some other component of the network computing provider 106 can modify the HTTP header associated with the resource to provide for or enhance caching, as described in detail below with respect to FIGS. 3 and 4. Modifying HTTP headers to include cache control information may result in personalized, sensitive, or otherwise private information being stored in a common cache and potentially transmitted to clients other than the client for which the information was personalized and intended. Therefore, the cache server 168 can implemented some method of ensuring that only public, generalized information is placed into the shared cache 169.

In some embodiments, the cache server 168, NCC POP 162, or some other component of the network computing provider 106 monitors requests for a resource over time and from a number of different clients 102a, 102b. If, after a predetermined or dynamically determined period of time, the resource that is retrieved from the content provider 104 to respond to the request is the same, the cache server 168 or some other component can determine that the resource public, generalized, and cacheable in a shared cache, such as the cache 169 of the cache server 168. For example, the cache server 168 may perform a checksum operation on each resource, and compare the results over time and across NCC POPs and clients to detect public resources. If the checksums of objects match, the cache server 168 can determine with a high degree of confidence that the two objects are identical. In some cases, the cache server 168 can determine that a resource of a particular name and source is public if it is requested by two separate clients over the course of hours and the retrieved resources are identical. In other cases, the cache server 168 can conclude that a resource is public only if it is requested by thousands or millions of different clients over the course of days, or longer, and in each case, or some percentage exceeding a threshold, the resource is identical. Other configurations are possible, including some combination of the previous examples.

Subsequent to or independent of the caching determinations and operations described above, the NCC POP 162 can respond to the client 102a by transmitting the resource to the client 102a over the communication network 108 at (E). In some embodiments, the modified HTTP header is provided with the requested resource to the client 102 so that the client 102*a* may also cache otherwise non-cacheable resources. Upon receipt of the resource, the client 102*a* may cache the resource in a local cache 124*a* at (F). The client 102*a* may process and display the resource and/or request additional resources from the NCC POP 162. Returning to the example above, the browser 122*a* on the client 102*a* can process the index.html file, parsing it and determining which embedded resources and other associated objects to request next in order to fully render and execute the requested network resource. Embedded resources may include images, videos, executable code files, and the like. The browser 122*a* can generate a separate request for each of the resources and transmit the requests to the NCC POP 162 over the communication network 108. The NCC POP 162 can respond to each request in similar fashion to the response described above with respect to the originally requested index.html file. In some embodiments, non-browser applications may request network content from a network computing provider 106. Illustratively, in the case of such non-browser applications, network resources or content may include any file type or format known in the art and supported by the specific software application. Requests for such content may be processed and responded to in similar fashion to the response described above with respect to the HTML file.

Turning now to FIG. 2B, interactions with respect to the processing of a request for a resource which has been previously cached at the cache server 168 will now be described. A user may cause a client 102*b* to load a browser 122*b* for accessing content provided by one or more content providers 104. The content may include the same resource (https://www.xyzwebsite.com/index.htm) that was requested and received by client 102*a*, as described above with respect to FIG. 2A. The client 102*b* may be a different client, located in a different physical location, configured with different hardware, software, and performance characteristics than the client 102*a* which previously requested the HTML file. Alternatively, the client 102*b* may be identical to the previously requesting client 102*a*, or the client may 102*b* may share some subset of configuration characteristics with the previously requesting client 102*a*.

The client 102*b* can transmit a request for the HTML file to the NCC POP 162 via the communication network 108 at (A). The NCC POP 162 may be the same NCC POP that processed the request from the previously requesting client 102*a*, or it may be a different NCC POP that has access to a common cache server 168 or other shared caching system. Responsive to the request received from the client 102*b*, the NCC POP 162 may perform initialization operations similar to those described above with respect to FIG. 2A. The NCC POP 162 can then query the cache server 168 at (B) for the requested HTML file. In this example, the HTML file has been previously retrieved and cached in response to a request from client 102*a*, and therefore the cache server 168 can retrieve the HTML file from the cache 169 and respond to the NCC POP 162 with the requested HTML file at (C).

Typically a cache, such as a cache server 168 or a cache 124*b* local to the client 102*b*, will query the content source from which the resource was received to determine whether the resource has changed in the time since it was cached. The cache server 168 can make an "if-modified-since" request, transmitting to the content provider 104 an identifier for the resource and the date and time that it was cached. The content provider 104 can respond to the "if-modified-since" request with information indicating that the resource has not been modified, and therefore the cached version is fresh. Alternatively, the content provider 104 can respond to the "if-modified-since" request with a current copy of the resource if the resource has changed or if the resource is not cacheable.

In the current example, there was no cache control information in the header associated with the resource. The cache server 168 modified the header so that the resource could be cached. If the cache server 168 made an "if-modified-since" request to the content provider 104, the content provider 104 would respond with a copy of the resource because, from the perspective of the content provider 104, resources with no cache control information in their associated headers are not cacheable. By transmitting another copy of the resource over the communication network 108 to the cache server 186 in response to the "if-modified-since" request, the benefits of caching the resource at the cache server 168 would be lost. Therefore, to ensure that cached copy remains reasonably fresh without querying the content source to determine whether the resource is fresh, the cache server 168 can be pessimistic when modifying headers and set the cached resource to expire in a short period of time, such as a few hours or minutes. In some embodiments, the cache server 168 can calculate an expiration date or time for the resource based on its analysis of how often the resource changes and whether it is a private resource, as described above. Requests for the cached resource made after the expiration of the cached resource will be denied, and a current copy of the resource will be retrieved from the content source.

In response to retrieving the cached resource from the cache server 168, the NCC POP 162 can then transmit the HTML file to the client 102*b* via the communication network 108 at (D). Upon receipt of the requested file, the client 102*b* can store the cached file in a local cache 124*b* at (E). In some cases, the interactions illustrated in and described with respect to FIGS. 2A and 2B may result in a resource being received and cached by a client 102*b* even though the resource was originally transmitted by a content provider 104, without any cache control information, to an NCC POP 162 requesting the resource on behalf of a different client 102*a*. The same resource is subsequently received by client 102*b*, potentially from a different NCC POP, with a modified header that contains cache control information. Moreover, there has been no communication with the content provider 104 in response to the request from the client 102*b*, either directly from the client 102*b* or by the cache server 168 or an NCC POP on behalf of the client 102*b*.

FIG. 2C illustrates example interactions occurring in response to subsequent requests for the resource cached in a local cache 124*b* of the client 102*b*. In FIG. 2C, the client 102*b* that received the index.html file and stored it in local cache 124*b*, described above with respect to FIG. 2B, initiates a subsequent request for the same resource. First, the browser 122*b* queries the local cache 124*b* for the resource. The local cache 124*b*, upon determining that the resource is present, initiates an "if-modified-since" request to determine whether the locally cached copy is current at (A). As described above, the "if-modified-since" request is not transmitted to the content provider 104 because the content provider 104 will respond with a copy of the resource. Rather, the "if-modified-since" request is made to the NCC POP 162. In some embodiments, all requests from the client 102*b* are made to the NCC POP 162 rather than directly to the content provider 104 or other content sources, and therefore no additional configuration is necessary.

The NCC POP 162 or cache server 168 can maintain a listing of all resources which have been cached with modified cache control headers to ensure that no "if-modified-since" requests are made to the content providers 104 corresponding to those resources. Instead, the cache server 168 is configured to respond authoritatively to "if-modified-since" requests for content cached with modified header information. The NCC POP 162 can make an "if-modified-since" request to the cache server 168 rather than to the content provider 104. If the cached copy of the resource has not expired, the cache server 168 can respond accordingly. The NCC POP 162 can forward the response back to the client 102*b* at (B), which then loads the resource from the local cache 124*b* at (C). Alternatively, if the cache server 168 determines that the cached copy of the resource has expired, a current copy of the resource can be retrieved from the content provider 104, the header associated with the current copy can be modified to facilitate caching, and the current copy can be both cached at the cache server 168 and transmitted by the NCC POP 162 to the client 102*b* via the communication network 108. The client 102*b*, upon receipt of the current copy of the resource and the modified header, can then cache the resource in the local cache 124*b* and process the resource with the browser 122*b*.

In some embodiments, the cache server 168 can respond to "if-modified-since" requests with an HTTP header that contains an update to the resource, rather than a notification that the resource has not changed or a response containing the entire resource. For example, if a client 102*b* makes an "if-modified-since" request regarding an HTML file, the NCC POP 162, cache server 168, or some other component of the network computing provider 106 can retrieve an updated version of the HTML file from the content provider 104 even though the resource has been cached at the cache server 168 and the cached copy has not expired. The cache server 168 can then compare the newly retrieved version to the cached version, such as by using a "cliff" function, a "merge" function, a bytewise comparison, a string comparison, or some other comparison technique to determine whether and to what extent the HTML file has changed. If only a portion of the HTML file has changed, such as the textual contents of a "DIV" tag, that portion can be inserted into the response header that is transmitted to the client 102*b*, thereby reducing the amount of data that is transmitted to the client 102*b* while still ensuring that the client 102*b* receives updated resources. A similar procedure may be used for other types of resources. For example, an image file may be retrieved and compared to a cached version, and a byte range corresponding to the difference between the two image files may be transmitted within the response header.

The response header that is transmitted to the client 102*b* may contain an indication that the resource has changed. Rather than being embedded into, followed by, or otherwise transmitted with a complete copy of the updated resource, the response header may also include a field indicating which portion of the resource has changed (e.g.: the specific "DIV" tag, identified by an "ID" property, coordinates, or some other unique identifier). The response header may further contain a field including the changed portion (e.g.: the updated contents of the "DIV" tag). In addition to transmitting the response header to the client 102*b*, the response header may be cached at the cache server 168 so that it can be transmitted in response to subsequent "if-modified-since" requests until it expires, thereby obviating the need to request the resource from the content provider 104 and perform the "cliff" function and other operations described above in response to each "if-modified-since" request.

In some embodiments, rather than retrieving a new version of the resource in response to each request from a client, the NCC POP 162, cache server 168, or some other component of the network computing provider 106 may determine that a resource is incrementally updated on a predictable schedule, such as every eight (8) minutes. The cached version of the resource may be associated with a TTL of eight (8) minutes, or some other value that facilitates caching without introducing a risk that the cached copy will be out of date for an unacceptable period of time. In response to receiving an "if-modified-since" request regarding such a resource, the cache server 168 can determine whether the TTL has expired. If so, a new version of the resource can be retrieved from the content provider 104. As described above, any difference between the new version and the cached version can be determined, and a response header can be generated which contains only the changed portions.

In some cases, the difference between the cached resource and the current resource may be significant, and the new version of the resource can be transmitted to the client 102*b* in its entirety. For example, if the contents of more than a threshold number of "DIV" or "FRAME" tags in an HTML file have changed, the entire new version of the file may be transmitted. In another example, if the contents of a single "DIV" tag have changed, the entire new version of the file may be transmitted if the changed contents are too large to include in a response header.

Upon receipt of a response header containing updated portions of a resource, the client 102*b* can retrieve the version of the resource that has been cached in the local cache 124*b*. The response header can be inspected to determine which portion of the cached resource has changed, e.g.: the identity of the "DIV" tag or the range of bytes. The updated portion included in the response header can then be substituted into the cached resource at the corresponding location. The cached resource can then be re-cached and also processed for display on the client 102*b*.

Figure 3:
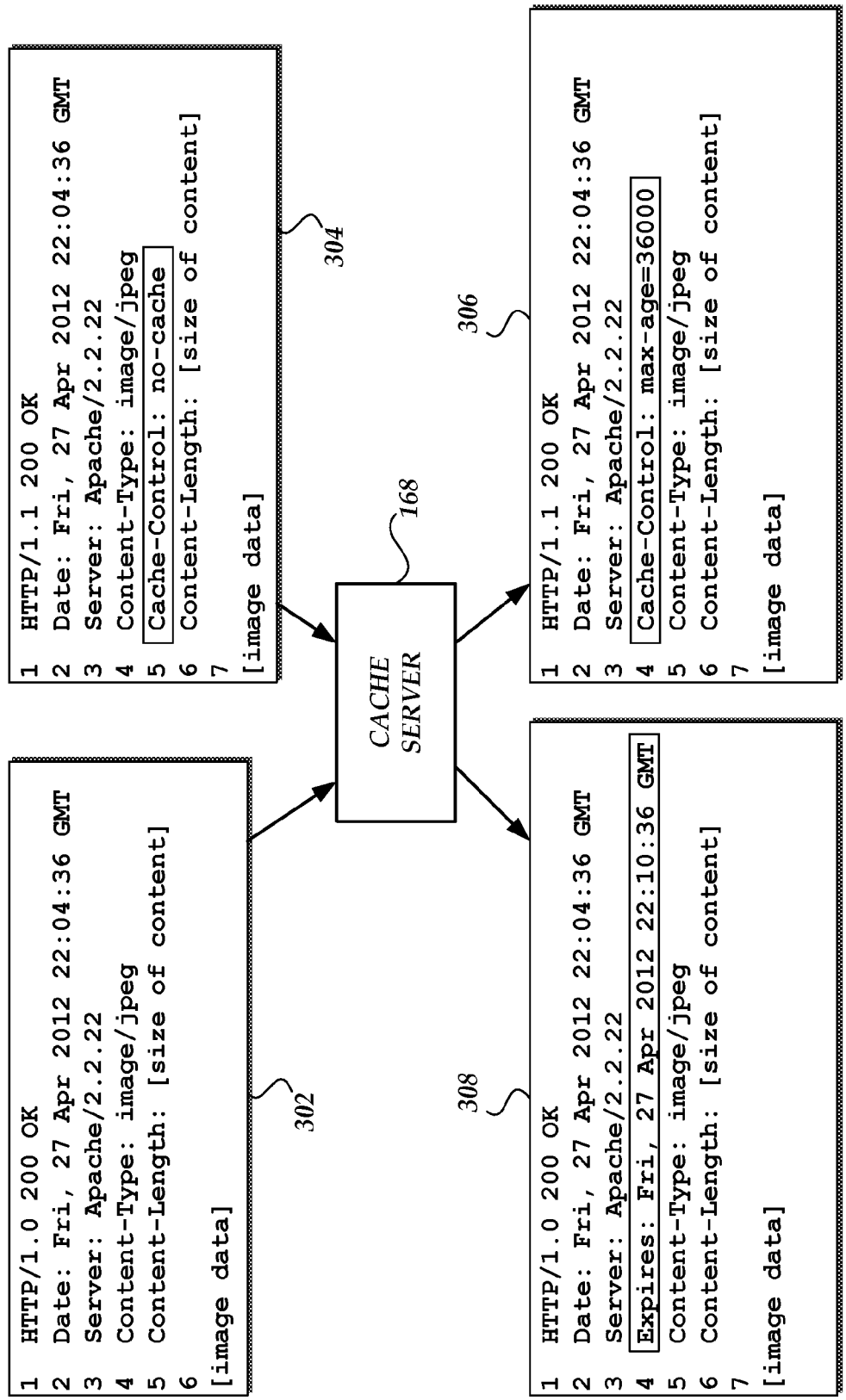
FIG. 3 is an HTTP header diagram illustrative of various HTTP headers and sample modifications to the headers to enable caching of the corresponding objects.

Turning now to FIG. 3, the modification of HTTP headers with no cache control information or which do not allow caching will be described. Header 302, illustrated in FIG. 3, does not contain any cache control information. The only data in the header 302 relates to the HTTP protocol, the time of the response, information about the server, and information about general characteristics of the resource, such as its type (a JPEG image in this, see line 4) and length. The data that defines the resource itself follows the header (see the area below line 6). In cases where a cache server 168 or some other component of a network computing provider 106 determines that the resource associated with this header is cacheable, the component can modify the header to facilitate caching.

Sample modified headers 306, 308 with caching information are illustrated in FIG. 3. Modified header 306 is illustrative of how header 302 can be modified to facilitate caching. Modified header 306 includes the standard HTTP/1.1 header field "Cache-Control." The value "max-age=36000" has been added to the "Cache-Control" field. A resource associated with this header may be cached for maximum of 6 minutes (36,000 ms). HTTP/1.0 caches might not implement the "Cache-Control" field. Modified header 308 is illustrative of how header 302 might be modified according to HTTP/1.0 to facilitate caching. The standard header field "Expires" has been added and assigned the value "Fri, 27 Apr. 2012 22:10:36." The effect of such a modification is the same as the modification in modified header 306: a resource associated with this header may be cached for a maximum of 6 minutes (22:10:36 is 6 minutes after the date and time of the response, shown in line 2 of modified header 308).

In some cases, a header may include cache control information indicating that the resource associated with the header is not to be cached. Header 304, for example, includes the "Cache-Control" field and has an assigned value of "no-cache", as shown in line 5. The "no-cache" value indicates that the resource associated with the header 304 is not cacheable. Other values for the "Cache-Control" field, such as "private," can also indicate that the resource is not cacheable in certain cases. For example, the "private" value indicates that the associated resource may not be cached in a shared cache, as might be used by a proxy server, but also that the resource may be cached in a private cache, as might be used on a client device. While a cache server 168 may modify such headers using the techniques described herein in order to facilitate caching of the associated resources, the cache server 168 may implement a policy that it will not modify headers that specify the resource is not cacheable. In some embodiments, the cache server 168 may implement a policy that certain "Cache-Control" values will be modified, while others will not. For example, the cache server 168 may implement a policy that it will never modify headers when the header has a value of "private" in the "Cache-Control" field, due to the shared nature of the cache 169. Clients 102*a*, 102*b* may still cache such resources locally in caches 124*a*, 124*b*. The techniques described above may also be applied to different header fields and other caching implementations. For example, HTTP/1.0 caches might not implement "Cache-Control," but rather might only implement "Pragma: no-cache."

Figure 4:
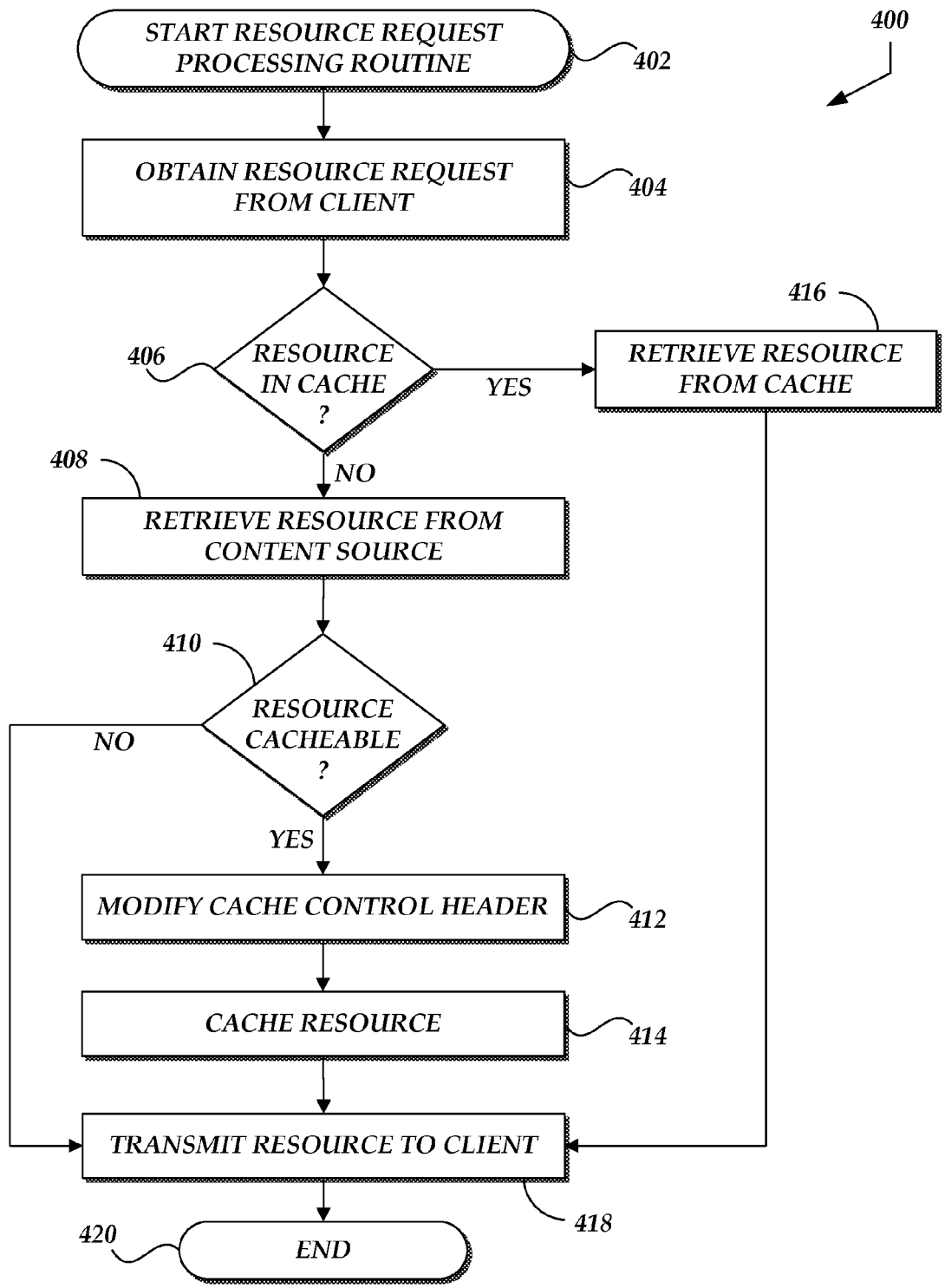
FIG. 4 is a flow diagram of an illustrative process for responding to a request for a resource.

FIG. 4 illustrates a sample routine for processing resource requests. The routine 400 may be implemented by an NCC POP or some other networked intermediary that receives requests for content from one or more clients and requests the content from one or more content sources on behalf of the clients. The routine 400 can be implemented as a software program or collection of programs residing within non-transitory computer storage, such as RAM, ROM, a hard disk, or the like, of a computing device associated with an NCC POP. One or more processors of the computing device can execute the software program.

The routine 400 begins at block 402. The routine 400 may be a background process that executes on an NCC, some other component of an NCC POP, or some other entity within a network computing provider. Alternatively, the routine 400 may be instantiated whenever a new request is obtained from a client at block 404.

At block 404, the NCC obtains a resource request from a client. The request may include a URL or it may include some other identifier for the requested resource. In a common example, the requested resource may be an embedded resource associated with a web page. For example, the client may have previously requested and received the HTML file that defines the web page at http://www.xyzwebsite.com/index.html. The HTML file may include an embedded reference to a library of executable code, such as the JQuery JavaScript library, that is commonly embedded in network resources from geographically diverse, unaffiliated content providers.

At decision block 406, the NCC can determine whether the requested resource is in the cache. The cache may be a shared cached associated with each NCC POP of a network computing provider. In some embodiments, the cache may be a shared cache, independent of the network computing provider, which provides caching services to any number of network computing providers and other network entities, such as content providers, CDN service providers, and the like. In some embodiments, each NCC POP maintains its own cache, and the various NCCs associated with the NCC POP can query the shared cache. Returning to the example above, the code library may be present in the shared cache. It may have been retrieved tens, hundreds, or thousands of times on behalf of different clients. The HTTP header associated with the code library, however, may not have included a cache control entry. The NCC POP or cache server may have modified the HTTP header and cached the code library so that it would be available for future requests. Because the code library was previously cached, the NCC can retrieve the code library from the cache at block 416, and the routine 400 can then proceed to block 418, described below. Alternatively, if the code library is not already in the cache, the routine 400 proceeds to block 408.

At block 408, the NCC retrieves the requested resource from the content source. Upon receipt of the requested resource, the NCC may perform a checksum operation and send the results to the cache server or some other component. The cache server or other component can record the results of the checksum for future use in determining whether the resource is cacheable. The routine 400 then proceeds to decision block 410.

At decision block 410, the NCC can determine whether the resource is cacheable. As described above, the header associated with the resource may contain cache control information, such as an expiration, that can be used to cache the resource. In many cases, the header contains no such information even though the resource is identical for some or all users over a period of time, and therefore caching the resource would provide a performance improvement without putting personal or sensitive information at risk. In the current example, the NCC can obtain a history of checksums for the requested resource and determine the portion or percentage of the checksums that match the checksum for the currently retrieved copy. In some embodiments, only checksums for copies of the resource retrieved within a period of time of the currently retrieved copy, such as a number of minutes, hours, or days, are used. If a number, portion, or percentage of the checksums are identical, and that value exceeds a predetermined or dynamically determined threshold, the resource is determined to be cacheable, and the routine 400 proceeds to block 412. Otherwise, the routine 400 proceeds to block 418.

At block 412, the NCC can modify the header associated with the resource to facilitate caching if the header does not contain an indication that the resource is cacheable. Example modifications to resource headers are illustrated in FIG. 3 and described above. The routine 400 then proceeds to block 414.

At block 414 the resource is cached. As described herein, the resource can be cached at a shared cache server, at the NCC POP, or at some external caching service. In some embodiments, a modified version of the resource may be cached. For example, the NCC may include a content processing and rendering engine, such as a network browsing application, with which the NCC processes retrieved content. The processing can include parsing code files, compiling executable code, rendering images, generating in-memory objects, and the like. The processing may also include optimizing the resource for various target devices, such as scaling images size for transmission to devices with small screens or replacing videos with still images for transmission to devices with limited network bandwidth or no video playback application. In such systems, the NCC may then transmit some or all of the processed resources to the requesting client, thereby shielding the client from some of the processing requirements associated with the requested resource. In addition, the version of the resource that is cached may be the processed version. For example, the cached version can be an in-memory object representing a web page, such as a DOM, or a precompiled version of an executable code library, such as JQuery. Moreover, multiple versions may be cached, with each version corresponding to a different optimization of the resource.

At block 418, the NCC can transmit the resource to the requesting client. If the header associated with the resource was modified to facilitate caching at the shared caching server, the modified header may also be transmitted to the client. The client may then cache the resource locally. In some embodiments, the header may be modified differently for transfer to the client than the modification applied for caching at the cache server. The techniques described above with respect to FIG. 3 may also be used in such cases. In some embodiments, the original, unmodified header may be transmitted to the client.

Depending on the embodiment, certain acts, events, or functions of any of the processes or algorithms described herein can be performed in a different sequence, can be added, merged, or left out all together (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y or Z. Thus, such conjunctive language is not generally intended to imply that certain embodiments require at least one of X, at least one of Y and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system for caching network resources, the system comprising:
   one or more processors;
   a computer-readable memory; and
   a module residing in the computer-readable memory and executed by the one or more processors, the module, when executed, configured to:
      service a request for a network resource, wherein servicing the request comprises retrieving a responsive copy of the network resource from a content provider;
      determine, based at least in part on a plurality of previously serviced requests for the network resource, whether the network resource is cacheable, wherein the plurality of previously serviced requests are originally obtained from a plurality of client devices, and wherein determining whether a network resource is cacheable comprises computing a checksum for at least two responsive copies and determining whether the computed checksums are equivalent;
      retrieve a copy of the network resource from a content provider independent of the system, wherein data associated with the copy does not indicate that the copy is cacheable;
      modify the data associated with the copy to indicate that the copy is cacheable;
      cache the copy in a shared cache; and
      respond to requests for information regarding the cached copy.

2. The system of claim 1 wherein the network resource comprises one of an HTML file, HTML application, JavaScript file, CSS file, image, video, animation, applet, document, or network accessible file.

3. The system of claim 1 wherein the data associated with the copy comprises an HTTP header and wherein the modification comprises one of: (a) adding a field and a value corresponding to the field to the HTTP header; or (b) modifying a value corresponding to a field in the HTTP header.

4. The system of claim 1 wherein a request for information regarding the cached copy comprises an "if-modified-since" request.

5. A computer-implemented method for caching network resources, the computer-implemented method comprising:
- determining, by a computing system comprising one or more computing devices, a caching property for a network resource, the determination based at least in part on a plurality of requests for the network resource, wherein the plurality of requests are obtained from a plurality of client devices;
- retrieving a copy of the network resource from a content provider independent of the computing system;
- modifying data associated with the copy to reflect the caching property, wherein modifying the data associated with the copy includes adding, to an HTTP header, a "Cache-Control" field and a corresponding value "max-age=n," wherein "n" represents time in milliseconds; and
- caching the copy in a shared cache.

6. The computer-implemented method of claim 5 wherein the network resource comprises one of an HTML file, HTML application, JavaScript file, CSS file, image, video, animation, applet, document, or network accessible file.

7. The computer-implemented method of claim 5 wherein each client device of the plurality of client devices is associated with the computing system.

8. The computer-implemented method of claim 7 wherein each request of the plurality of requests is originally transmitted from the plurality of client devices to the computing system.

9. The computer-implemented method of claim 5 wherein modifying the data associated with the copy further comprises modifying, in an HTTP header, a value corresponding to a "Cache-Control" field.

10. The computer-implemented method of claim 5 wherein modifying the data associated with the copy further comprises extending, in an HTTP header, an expiration date or time associated with the copy.

11. The computer-implemented method of claim 5 wherein determining a caching property comprises computing a checksum for at least two copies of the network resource retrieved in response to requests obtained from the plurality of client devices and observing whether the computed checksums are equivalent.

12. The computer-implemented method of claim 11 wherein the requests corresponding to the at least two copies of the network resource are originally obtained from the plurality of client devices within a predetermined period of time.

13. The computer-implemented method of claim 5, further comprising responding to "if-modified-since" requests for information regarding the cached copy, the response comprising data indicating that the cached copy has not been modified.

14. A computer-implemented method for caching network resources, the computer-implemented method comprising:
- retrieving, by a computing system comprising one or more computing devices, a copy of a network resource from a content provider independent of the computing system, wherein the copy is retrieved in response to a request obtained from a client computing device, and wherein an HTTP header associated with the copy does not indicate that the copy is cacheable;
- adding a "Cache-Control" field and a corresponding value "max-age=n," wherein "n" represents the time in milliseconds, to the HTTP header associated with the copy to indicate that the copy is cacheable; and
- caching the copy in a shared cache.

15. The computer-implemented method of claim 14 wherein the network resource comprises one of an HTML file, HTML application, JavaScript file, CSS file, image, video, animation, applet, document, or network accessible file.

16. The computer-implemented method of claim 14 further comprising adding, to an HTTP header, an "Expires" field and a corresponding value comprising the date and time after which the copy is not available.

17. The computer-implemented method of claim 14 further comprising modifying, in an HTTP header, a value corresponding to a "Cache-Control" field.

18. The computer-implemented method of claim 14 further comprising responding to an "if-modified-since" request for information regarding the cached copy, the response comprising data indicating that the cached copy has not been modified.

19. The computer-implemented method of claim 14 further comprising processing, by a browser application of the computing system in communication with a browser application of the client computing device, the copy of the network resource, wherein caching the copy comprises caching the processed copy.

20. The computer-implemented method of claim 19, wherein processing the copy comprises one of parsing the network resource, compiling the network resource, rendering the network resource, or optimizing the network resource for a device with predetermined characteristics.

* * * * *